United States Patent
Dagley et al.

(10) Patent No.: US 12,131,641 B2
(45) Date of Patent: Oct. 29, 2024

(54) SYSTEMS AND METHODS FOR PROVIDING AN AUTONOMOUS VEHICLE VENDOR LOT

(71) Applicant: Capital One Services, LLC, McLean, VA (US)

(72) Inventors: Geoffrey Dagley, McKinney, TX (US); Qiaochu Tang, The Colony, TX (US); Jason Hoover, Grapevine, TX (US); Avid Ghamsari, Frisco, TX (US); Micah Price, Plano, TX (US)

(73) Assignee: Capital One Services, LLC, McLean, VA (US)

( * ) Notice: Subject to any disclaimer, the term of this patent is extended or adjusted under 35 U.S.C. 154(b) by 768 days.

(21) Appl. No.: 17/114,641

(22) Filed: Dec. 8, 2020

(65) Prior Publication Data

US 2021/0383698 A1 Dec. 9, 2021

Related U.S. Application Data

(60) Provisional application No. 63/035,080, filed on Jun. 5, 2020.

(51) Int. Cl.
*G01C 21/00* (2006.01)
*B60R 25/20* (2013.01)
(Continued)

(52) U.S. Cl.
CPC ............ *G08G 1/142* (2013.01); *B60R 25/20* (2013.01); *G01C 21/3407* (2013.01);
(Continued)

(58) Field of Classification Search
CPC ........ G08G 1/142; G08G 1/017; G06N 20/00; G06V 20/20; G06V 2201/08; B60R 25/20;
(Continued)

(56) References Cited

U.S. PATENT DOCUMENTS

| 6,340,935 B1 * | 1/2002 | Hall ....................... G08G 1/142 340/905 |
| RE41,080 E | 1/2010 | Mahoney |

(Continued)

FOREIGN PATENT DOCUMENTS

KR 20180100842 A * 9/2018

*Primary Examiner* — Adam M Alharbi
(74) *Attorney, Agent, or Firm* — Bookoff McAndrews, PLLC (57) ABSTRACT

An autonomous vehicle vendor lot may include a plurality of vehicle selection indicators, a visual navigation system, and a control system. The indicators may be distributed in the lot, associated with a respective parking spot in the lot, and operable to generate a visual indication indicative of a selection of a vehicle in the respective parking spot. The navigation system may be operable to generate a visual indication of a route between various locations in the lot. The control system may be operatively connected to the indicators and the navigation system, and configured to: receive a vehicle search query; identify at least one vehicle in the lot corresponding to the query; operate each vehicle selection indicator corresponding to each identified vehicle; identify a respective location in the lot for each identified vehicle; and operate the visual navigation system to generate a visual indication of a route to at least one identified vehicle.

20 Claims, 5 Drawing Sheets

(51) Int. Cl.
    *G01C 21/34*     (2006.01)
    *G01C 21/36*     (2006.01)
    *G06N 20/00*     (2019.01)
    *G06Q 10/0631*     (2023.01)
    *G06Q 30/0601*     (2023.01)
    *G06V 20/20*     (2022.01)
    *G08G 1/017*     (2006.01)
    *G08G 1/14*     (2006.01)
    *G06K 7/14*     (2006.01)
    *G06Q 10/087*     (2023.01)
    *G06Q 30/0645*     (2023.01)

(52) U.S. Cl.
    CPC ......... *G01C 21/3626* (2013.01); *G06N 20/00* (2019.01); *G06Q 10/06315* (2013.01); *G06Q 30/0625* (2013.01); *G06Q 30/0639* (2013.01); *G06V 20/20* (2022.01); *G08G 1/017* (2013.01); *G06K 7/1417* (2013.01); *G06Q 10/087* (2013.01); *G06Q 30/0613* (2013.01); *G06Q 30/0645* (2013.01); *G06Q 2240/00* (2013.01); *G06V 2201/08* (2022.01)

(58) Field of Classification Search
    CPC ............ G01C 21/3407; G01C 21/3626; G06Q 10/06315; G06Q 30/0625; G06Q 30/0639; G06Q 10/087; G06Q 30/0613; G06Q 30/0645; G06Q 2240/00; G06K 7/1417
    See application file for complete search history.

(56) References Cited

U.S. PATENT DOCUMENTS

| | | | |
|---|---|---|---|
| 9,324,106 | B2 | 4/2016 | Argue et al. |
| 9,704,359 | B2 | 7/2017 | Boullery et al. |
| 9,812,015 | B1 | 11/2017 | Cox et al. |
| 9,964,951 | B1 | 5/2018 | Dunn et al. |
| 10,453,216 | B1 | 10/2019 | Zelenskiy et al. |
| 10,643,242 | B2 * | 5/2020 | Rowe .................. G08G 1/14 |
| 2004/0032327 | A1 | 2/2004 | Flick |
| 2004/0160304 | A1 | 8/2004 | Mosgrove et al. |
| 2007/0090921 | A1 | 4/2007 | Fisher |
| 2008/0275630 | A1 | 11/2008 | Regienczuk |
| 2008/0301102 | A1 | 12/2008 | Liang |
| 2008/0319664 | A1 | 12/2008 | Kremin et al. |
| 2009/0182499 | A1 | 7/2009 | Bravo |
| 2011/0199479 | A1 | 8/2011 | Waldman |
| 2011/0288891 | A1 | 11/2011 | Zaid et al. |
| 2013/0113936 | A1 | 5/2013 | Cohen et al. |
| 2014/0207629 | A1 | 7/2014 | Bradely et al. |
| 2014/0336920 | A1 | 11/2014 | Burrell et al. |
| 2015/0039365 | A1 | 2/2015 | Haque |
| 2015/0066545 | A1 | 3/2015 | Kotecha et al. |
| 2015/0095123 | A1 | 4/2015 | Wenninger |
| 2015/0179070 | A1 | 6/2015 | Sandbrook |
| 2015/0228125 | A1 | 8/2015 | Silva et al. |
| 2015/0271164 | A1 | 9/2015 | Hamid |
| 2016/0086029 | A1 | 3/2016 | Dubuque |
| 2016/0265935 | A1 | 9/2016 | Ma |
| 2016/0307047 | A1 | 10/2016 | Krishnamoorthy et al. |
| 2016/0349062 | A1 | 12/2016 | Campan et al. |
| 2017/0116783 | A1 | 4/2017 | Huang et al. |
| 2017/0140452 | A1 | 5/2017 | Li et al. |
| 2017/0186317 | A1 | 6/2017 | Franklin et al. |
| 2017/0219361 | A1 | 8/2017 | Mays et al. |
| 2017/0343375 | A1 | 11/2017 | Kamhi et al. |
| 2018/0005446 | A1 | 1/2018 | Elazary et al. |
| 2018/0043777 | A1 | 2/2018 | Ishibashi et al. |
| 2018/0100842 | A1 * | 4/2018 | Ahn .................. G01N 27/128 |
| 2018/0154867 | A1 | 6/2018 | Golduber |
| 2018/0170256 | A1 | 6/2018 | Medenica et al. |
| 2018/0365883 | A1 | 12/2018 | Fillhardt et al. |
| 2019/0039567 | A1 | 2/2019 | Froitzheim et al. |
| 2019/0050634 | A1 | 2/2019 | Nerayoff et al. |
| 2019/0057372 | A1 | 2/2019 | Batten et al. |
| 2019/0072390 | A1 | 3/2019 | Wang et al. |
| 2019/0107411 | A1 | 4/2019 | Gil |
| 2019/0120650 | A1 | 4/2019 | Miyake et al. |
| 2019/0137290 | A1 | 5/2019 | Levy et al. |
| 2019/0137294 | A1 | 5/2019 | Jung et al. |
| 2019/0294889 | A1 | 9/2019 | Sriram et al. |
| 2019/0304307 | A1 | 10/2019 | Huang et al. |
| 2019/0308616 | A1 | 10/2019 | Jie et al. |
| 2019/0325749 | A1 * | 10/2019 | Tu .................. G08G 1/146 |
| 2020/0012829 | A1 | 1/2020 | Davidson et al. |
| 2020/0400446 | A1 * | 12/2020 | Beaurepaire .......... G08G 1/144 |

* cited by examiner

SYSTEMS AND METHODS FOR PROVIDING AN AUTONOMOUS VEHICLE VENDOR LOT

RELATED APPLICATIONS

This application claims the benefit of priority of U.S. Provisional Application No. 63/035,080, filed on Jun. 5, 2020, the entirety of which is incorporated by reference herein.

TECHNICAL FIELD

Various embodiments of the present disclosure relate generally to an autonomous vehicle vendor lot, and, more particularly, to systems and methods for autonomously displaying visual indications of routes and destinations in a vehicle vendor lot.

BACKGROUND

For some products, customers may prefer visiting an in-person vendor as opposed to an electronic marketplace. A purchasing decision for some products may benefit from in-person interaction that is unavailable on an electronic marketplace such as, for example, a hands-on test, a direct visual inspection or comparison, etc. However, an in-person vendor may not offer many of the conveniences associated with an electronic marketplace. An electronic marketplace may generally offer search tools that facilitate location of a particular product, and may allow transactions to proceed without human interaction. Such features are generally unavailable at an in-person vendor.

A customer unfamiliar with the layout and organization of products at an in-person vendor may have difficulty finding a particular product. When the vendor provides many products with only minute differences between them, this difficulty may be exacerbated. For example, a vehicle dealership lot may include a multitude of similar vehicles that may differ from each other in any of a multitude of ways that may or may not be apparent without close inspection.

Generally, vendors that encounter these types of difficulties may employ a guide-person, such as a salesman, clerk, attendant, or the like, who leverages knowledge about the products and the inventory of the vendor to help customers locate specific products. However, this type of personal knowledge may not be scalable to large inventories. Further, some customers may seek or vendors may desire to provide an autonomous customer experience, which is incompatible with the requirement for such a guide-person.

The present disclosure is directed to addressing above-referenced challenges. The background description provided herein is for the purpose of generally presenting the context of the disclosure. Unless otherwise indicated herein, the materials described in this section are not prior art to the claims in this application and are not admitted to be prior art, or suggestions of the prior art, by inclusion in this section.

SUMMARY OF THE DISCLOSURE

According to certain aspects of the disclosure, methods and systems are disclosed for operating an autonomous vehicle vendor lot.

In one aspect, an exemplary embodiment of an autonomous vehicle vendor lot may include: a plurality of vehicle selection indicators distributed in the lot, each vehicle selection indicator associated with a respective parking spot in the lot and operable to generate a visual indication indicative of a selection of a vehicle in the respective parking spot; a visual navigation system operable to generate a visual indication of a route between various locations in the lot; and a control system operatively connected to the plurality of vehicle selection indicators and the visual navigation system, and configured to: receive a vehicle search query; identify at least one vehicle in the lot corresponding to the vehicle search query; operate each vehicle selection indicator corresponding to the identified at least one vehicle; identify a respective location in the lot for the at least one identified vehicle; and operate the visual navigation system to generate a visual indication of a route to the at least one identified vehicle.

In another aspect, an exemplary embodiment of a control system for an autonomous vehicle vendor lot may include: a memory storing instructions; and a processor operatively connected to the memory and configured to execute the stored instruction to perform acts including: receiving a vehicle search query; identifying at least one vehicle in the lot corresponding to the vehicle search query; operating a respective vehicle selection indicator in the lot corresponding to the at least one identified vehicle to generate a visual indication of a selection of the at least one identified vehicle; identifying a respective location in the lot for the at least one identified vehicle; and operating a visual navigation system to generate a visual indication of a route to the at least one identified vehicle.

In a further aspect, an exemplary embodiment of a computer-implemented method of providing an autonomous vehicle vendor lot may include: receiving voice data from a user via a plurality of audio sensors; determining a location of the user in the lot via the plurality of audio sensors; generating a vehicle search query based on the received voice data; identifying at least one vehicle in the lot corresponding to the vehicle search query; operating a respective vehicle selection indicator in the lot corresponding to the at least one identified vehicle to generate a visual indication of a selection of the at least one identified vehicle; identifying a respective location in the lot for the at least one identified vehicle; and operating a visual navigation system to generate a visual indication of a route to the at least one identified vehicle, wherein: the route is based on the determined location of the user; and the visual navigation system includes a plurality of visual indicators distributed in the lot.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DETAILED DESCRIPTION OF EMBODIMENTS

The terminology used below may be interpreted in its broadest reasonable manner, even though it is being used in conjunction with a detailed description of certain specific examples of the present disclosure. Indeed, certain terms may even be emphasized below; however, any terminology intended to be interpreted in any restricted manner will be overtly and specifically defined as such in this Detailed Description section. Both the foregoing general description and the following detailed description are exemplary and explanatory only and are not restrictive of the features, as claimed.

In this disclosure, the term "based on" means "based at least in part on." The singular forms "a," "an," and "the" include plural referents unless the context dictates otherwise. The term "exemplary" is used in the sense of "example" rather than "ideal." The terms "comprises," "comprising," "includes," "including," or other variations thereof, are intended to cover a non-exclusive inclusion such that a process, method, or product that comprises a list of elements does not necessarily include only those elements, but may include other elements not expressly listed or inherent to such a process, method, article, or apparatus. Relative terms, such as, "substantially" and "generally," are used to indicate a possible variation of ±10% of a stated or understood value.

The term "vendor" generally encompasses an entity or person involved in providing, selling, leasing, and/or renting products to customers such as a seller, dealer, renter, provider, merchant, or the like, as well as an agent or intermediary of such an entity or person. A "customer" generally encompasses a person interested in or engaged in a purchase of a product, or a person that has purchased a product. A "product" generally encompasses a good, service, or the like having ownership or other rights that may be transferred. A "vehicle" generally encompasses a car, a truck, a motorcycle, a tractor, a bicycle, a boat, an airplane, or any other means of conveyance for a person. A "guide-person" generally encompasses a person engaged to assist a customer such as a salesman, a clerk, a technician, an attendant, a monitor, a guide, a broker, an agent, or the like.

A customer may prefer an in-person purchase of a product. For example, the customer may prefer to personally inspect, compare, or test the product, or perform another action generally not available at a remote purchasing option like an electronic marketplace. Further, the customer may seek, or a vender may desire to provide, an autonomous customer experience for the in-person purchasing of the product. For example, the purchase of a vehicle conventionally requires interaction with a salesman, which may be intimidating or stressful for, or otherwise not preferred by, a customer. A customer may prefer not to engage in haggling or negotiations with a person when making a purchase. A vendor may desire to provide hours for business outside of a typical work-day, or without a reliance on availability of staff. Environmental or social concerns may discourage or limit social interaction.

However, when providing products that may be visually similar, or that may include a multitude of variations, vendors generally provide a guide-person to assist with a customer's search, which is incompatible with an autonomous customer experience. Accordingly, improvements in technology relating to an autonomous customer experience are needed.

In the following description, embodiments will be described with reference to the accompanying drawings. As will be discussed in more detail below, in various embodiments, systems and methods for providing an autonomous vehicle vendor lot are described. It should be understood that while several embodiments of this disclosure describe autonomous vendor lots for vehicles, the systems and method disclosed herein may be adapted to other products offered for sale on a lot or the like such as, for example, appliances, model homes, sheds, or other buildings, furniture, art, consumer goods, kiosks, cubicles, exhibits, or the like.

In an exemplary use case, a customer may desire to purchase a vehicle. Via a user system, such as a mobile device or desktop computer, a user may provide authentication information (e.g., a financial prequalification, loan pre-authorization, or the like) to a vendor system. As used herein, "authentication information" generally encompasses information usable to confirm an identity of a customer, information usable to confirm a status of the customer such as a qualified purchaser, or the like. The customer may also provide a search query specifying one or more features of a vehicle desired by the customer. The vendor system may identify an autonomous lot having inventory corresponding to the search query, and may provide the user, via the user system, information associated with the autonomous lot such as, for example, a location, hours of operation, an appointment, instructions, etc. The user may travel to the autonomous lot. The vendor system may verify an authentication of the user. For example, the user, via the user system, may capture an image including a visual indicator such as a QR code, and provide the image to the vendor system. In another example, the user may access an interface device at the autonomous lot and provide authentication information such as a name, access code, or the like. In response to authenticating the user, the vendor system may identify one or more vehicles in the lot associated with the search query. The vendor system may identify locations, e.g., parking spots or the like, for the one or more identified vehicles. The vendor system may determine a path to the at least one identified vehicle. The vendor system may operate vehicle selection indicators, e.g., a lighting display, that correspond to a respective parking spot of the one or more identified vehicles. The vendor system may operate a visual navigation system, e.g., a further lighting display, that is indicative of the path to the at least one identified vehicle.

In another exemplary use case, the vendor system may modify the operating of the visual navigation system and/or the vehicle selection indicators in response to travel by the customer. For example, once the customer has reached a first of the one or more identified vehicles, the vendor system may operate the visual navigation system to indicate a path to a further identified vehicle and/or deactivate the visual selection indicator for the visited vehicle. In another example, the indicated path may be adjusted based on the customer deviating from the indicated path, based on a current location of the customer along the path, based on a detected obstruction or interruption along the path, or the like. The current position of the customer may be determined by, for example, one or more sensors, an estimated travel time, location data from the user device, data received from the user device such as images captured by the user device or interactions indicative of a location or of a visit to a vehicle, or the like. In a further example, the user may provide, e.g., via the user device or another system, a further search query, and the vendor may adjust the operating of the visual navigation system and/or the vehicle selection indicators in response to the further search query.

In another example, the vendor system may predict a search query of the customer, and adjust the operating of the visual navigation system and/or the vehicle selection indicators in response to the predicted search query. For example, the customer may visit a vehicle not identified based on the search query, and the vendor system may update the search query based on the visited vehicle. In another example, the customer may provide, e.g., via the user device or another system, further information about the customer's vehicle preferences, and the vendor system may adjust the search query based on the further information.

In another exemplary use case, a customer desiring to purchase a vehicle may arrive at an autonomous lot. The customer may access an interaction system, e.g., a kiosk or the like, and provide a vendor system with vehicle preference information, e.g., via the kiosk. The vendor system may generate a search query based on the vehicle preference information, and identify one or more vehicles in the lot associated with the search query. The vendor system may identify locations, e.g., parking spots or the like, for the one or more identified vehicles. The vendor system may determine a path to the at least one identified vehicle. The vendor system may operate vehicle selection indicators, e.g., a lighting display, that correspond to a respective parking spot of the one or more identified vehicles. The vendor system may operate a visual navigation system, e.g., a further lighting display, that is indicative of the path to the at least one identified vehicle.

In a further exemplary use case, a customer desiring to purchase a vehicle may arrive at an autonomous lot. The customer may utter spoken language that includes vehicle preferences of the customer. In some examples, the autonomous lot may include a prompt for the user to speak, e.g., "Tell me about what kind of vehicle you're looking for." The prompt may be a static display, a kiosk, an audio prompt, a video prompt, a visual prompt, combinations thereof, or the like. A vendor system may capture the uttered spoken language as audio data, e.g., via a microphone or the like. The vendor system may employ a natural language processing technique to generate a search query based on the captured audio data. The vendor system may identify one or more vehicles in the lot associated with the search query. The vendor system may identify locations, e.g., parking spots or the like, for the one or more identified vehicles. The vendor system may determine a path to the at least one identified vehicle. The vendor system may operate vehicle selection indicators, e.g., a lighting display, that correspond to a respective parking spot of the one or more identified vehicles. The vendor system may operate a visual navigation system, e.g., a further lighting display, that is indicative of the path to the at least one identified vehicle.

In some examples, one or more microphones may be distributed in the lot so as to capture spoken language from various locations in the lot. In some examples, audio data from various microphones may be compared to determine a location of the customer. In some examples, captured audio data may be used to generate a predicted search query. In some examples, the vendor system may employ a voice synthesizer to interact with the customer. For example, the customer, while visiting a particular vehicle may utter "I wish they had this one in red." The vendor system may employ a natural language processing technique to determine that the user has expressed a preference for the currently visited vehicle in the color red, and may determine that a vehicle in the inventory of the lot matches the customer's preference. The vendor system may employ the voice synthesizer to utter "We actually have a red one in stock! Shall I show you the way?" In response to an acceptance by the customer, the vendor system may adjust the operating of the visual navigation system and/or the vehicle selection indicators based on the determined vehicle.

In some embodiments, the path determined by the vendor system for the customer is determined to reduce and/or minimize a total travel distance for the customer to visit the at least one identified vehicle. In some embodiments, the path is determined to prioritize an order for visiting vehicles based on a ranking associated with results from the search query. In some embodiments, the path is determined so as to cause the customer to pass by one or more vehicles not identified, but that may be predicted to be of interest to the customer.

In some embodiments, the vendor system is configured to improve, facilitate, and/or optimize the determined path by determining a parking spot for a vehicle entering the lot so as to fall along and/or facilitate a path thereto. For example, the vendor system may determine that vehicles with a particular feature in common are likely to appear together as search results to a particular search query, and may designate a location for a vehicle having that particular feature so as to fall along an existing path for similar vehicles, or so as to route the path in a particular manner. In some embodiments, the vendor system may transmit parking directions to a driver of the entering vehicle, such as via a mobile device, a radio, or other communication device. In some embodiments, the vendor system operates the vehicle selection indicators and/or the visual navigation system to direct the driver to a designated parking spot.

In some embodiments, the vendor system may employ one or more machine learning techniques for determining the path for the customer, determining the location of the customer, and/or determining the parking spot for a vehicle entering the lot.

In some embodiments, a customer visiting a particular vehicle may decide to, for example, take the vehicle for a test drive, purchase or rent the vehicle, or the like. In some embodiments, the autonomous lot may include an autonomous key storage usable to provide a key for a selected vehicle to the customer. In some embodiments, the vendor system may provide, e.g., via the user device, a kiosk, or the like, an interactive interface for fulfilling a purchase transaction for a selected vehicle. Further details relating to such features are discussed in U.S. patent application Ser. No. 16/434,551, the disclosure of which is incorporated by reference herein in its entirety.

In an additional exemplary use case, the autonomous lot may be used to provide live (e.g., real time, dynamic, etc.) feedback for a vehicle search query interaction with a customer. The customer may, for example, submit a first search query that results in the identification of a first set of vehicles in the lot, e.g., by illuminating vehicle selection indicators for one or more of the identified vehicles. The customer may then submit a refined search query, and the vehicle selection indicators may be updated based on the refined search query. In this manner the customer may receive visual feedback of narrowing search results as they further refine the search query. In response to the number of identified vehicles being narrowed to a threshold amount, e.g., one or five or ten vehicles, the lot may illuminate visual indicators of a visual navigation system to illuminate a route for the customer to follow in the lot to visit the narrowed selection of vehicles.

In another exemplary use case, a customer may desire to rent a boat. While reference is made to renting a boat, it should be understood that the same or similar method may be used for renting other items, such as a car/vehicle, hotel room, etc. Prior to arriving at an autonomous boat lot, or at an autonomous customer service kiosk at the lot, the customer may register with the lot by providing authentication information. The authentication information may include information usable to verify an identity of the customer, and may include financial information for the customer, such as budget information. The authentication information may also include boat preference information. The customer may arrive at an autonomous boat rental lot. A vendor system may access the information submitted by the customer, and may generate a search query based on such information. For example, the vendor system may identify one or more boats that align with the customer's preferences, budget, a risk assessment of the customer, or other factors. The vendor system may operate boat selection indicators and/or a visual navigation system to indicate the identified one or more boats and route(s) via docks of the boat rental lot to the identified boat(s). The customer may travel to any of the identified boat(s). The vendor system may receive a boat selection indication from the customer, e.g. a selection via a user device, the kiosk, a voice selection, or the like. The vendor system may authorize the customer to operate the selected boat, e.g., by unlocking a key storage unit that includes a key for the selected boat, by transmitting an activation signal to the selected boat, or the like. The vendor system may execute a payment transaction for the rental of the selected boat, e.g., a security deposit, rental fee, or the like. In some embodiments, the vendor system may determine information associated with the rental such as, for example, whether the selected boat has left the lot, has returned from the lot, an amount of fuel spent during the rental, a total time for the rental until the selected boat is returned, etc. The vendor system may execute a payment transaction based on such information.

Figure 1:
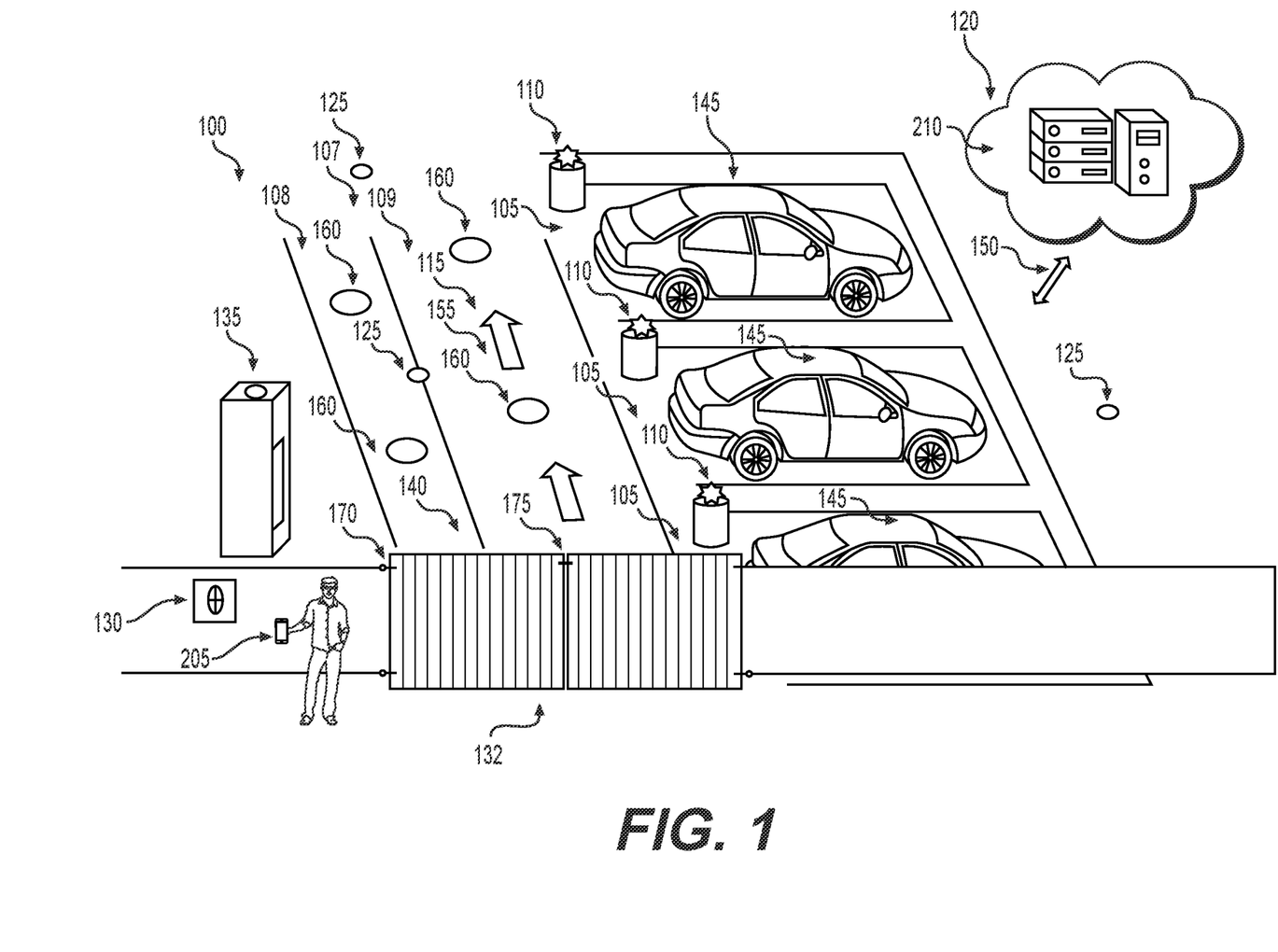
FIG. 1 depicts an exemplary embodiment of an autonomous vehicle vendor lot, according to one or more embodiments.

FIG. 1 depicts an exemplary embodiment of an autonomous vehicle vendor lot 100 that may be utilized with the techniques and technologies presented herein. While this embodiment pertains to an autonomous lot for vehicles, it should be understood that one or more aspects discussed with regard to an autonomous vehicle lot may be adapted to any suitable vendor establishment such as, a boat rental lot, a residence rental property such as hotel rooms, cabins, etc., storage space rentals, or the like. The lot 100 includes a plurality of parking spots 105, a plurality of pathways 107 (only one shown in FIG. 1 for clarify), a plurality of vehicle selection indicators 110, a visual navigation system 115, a control system 120, a plurality of sensors 125, an entrance element 130, a user interface device 135, and an access restriction device 140. One or more vehicles 145 may be received in the plurality of parking spots 105. Components of the lot 100, such as the foregoing, may communicate with each other and/or other device via an electronic network 150.

The parking spots 105 may be distributed in the lot 100. The plurality of pathways 107 may provide access to the parking spots 105. The plurality of pathways 107 may be general pathways, e.g., pathways shared by persons for walking and vehicles for travelling. The pathways 107 may include pedestrian pathways 108 and vehicle pathways 109. Although the current embodiment includes parking spots 105 and pathways 107, it should be understood that other elements may be used in other embodiments. For example, an autonomous boat vendor lot may include boat slips for receiving a respective boat, and docks that provide access to the boat slips. An autonomous furniture vendor may include floor displays and pathways that provide access to the floor displays, etc.

In some embodiments, the vehicle selection indicators 110 may be distributed in the lot 100 such that each vehicle selection indicator 110 is associated with a respective one of the parking spots 105. In some embodiments, a vehicle selection indicator 110 may be associated with a region and/or a plurality of parking spots 105. In some embodiments, a vehicle selection indicator 110 associated with a region and/or multiple parking spots 105 may be configured to generate a directional indication associated with a sub-region and/or a sub-set of the multiple parking spots 105. Each vehicle selection indicator 110 is operable to generate a visual indication indicative of a selection of a vehicle 145 in the respective parking spot 105 corresponding to the vehicle selection indicator 110. In the embodiment depicted in FIG. 1, the vehicle selection indicators 110 are positioned proximate to an entrance for each parking spot 105. However, any suitable position for the vehicle selection indicators 110 may be used in other embodiments such as, for example, on a structure or wall proximate to the entrance, a side, floor, ceiling, or a back of the parking spots 105. In some embodiments, the visual indication generated by the vehicle selection indicators 110 may utilize a lighting element, e.g., an LED light, an LED display, a lightbulb, or any other suitable lighting element. In some embodiments, the vehicle selection indicators 110 may be integrated into lighting for the lot 100. When operated, the vehicle selection indicators 110 may be configured to illuminate a region of the corresponding parking spot 105. As discussed in further detail below, in some embodiments, the vehicle selection indicators 110 are operable to generate light in different colors.

The visual navigation system 115 may be operable to generate a visual indication of a route 155 between various locations in the lot 100. The route indicated by the visual navigation system 115 may correspond to a portion of the pathways 107. In the embodiment depicted in FIG. 1, the visual navigation system 115 includes a plurality of visual indicators 160 distributed in the lot 100. Each visual indicator 160 is operable to generate a visual indication indicative of a portion of the route. In the embodiment depicted in FIG. 1, the visual indicators 160 are positioned on a portion of the floor of the lot corresponding to a respective pathway 107. However, any suitable position for the visual indicators 160 may be used in other embodiments such as, for example, on a structure positioned along a pathway 107, on a wall or ceiling proximate to the pathway 107, or the like. In some embodiments, the visual indication generated by the visual indicators 160 may utilize a lighting element, e.g., an LED light, an LED display, a lightbulb, or any other suitable lighting element. In some embodiments, the visual indicators 160 may be integrated into lighting for the lot 100. When operated, the visual indicators 160 may be configured to illuminate a region of the corresponding pathway 107. As discussed in further detail below, in some embodiments, the visual indicators 160 are operable to generate light in different colors. The visual indicators 160 may be of various shapes in various embodiments such as, for example, circles or other geometric shapes, arrows, maps, text, or combinations thereof. In some embodiments, the visual indicators 160 may be adjustable, e.g., a directional indicator that may be e operated to indicate a desired direction. In some embodiments, the visual indicators 160 may be animated. In some embodiments, there may be a variety of types or configurations of visual indicators 160 in the lot. In some embodiments, one or more of the visual indicators 160 may be integrated into one or more of the vehicle selection indicators 110, or vice-versa. In some embodiments, visual indicators 160 may operate as visual indicators when operated to illuminate a first color, shape, intensity, and/or the like, and may operate as vehicle selection indicators when operated to illuminate at a second color, shape, intensity, and/or the like.

The control system 120 is operatively connected to one or more components of the lot, e.g., the vehicle selection indicators 110 and/or the visual navigation system 115. The control system 120 may be configured to communicate with various components such as, for example, a user device like a mobile device or user computer system, a vendor system such as an inventory system or customer interface, a payment processing system, a financial system, or the like. In some embodiments, at least a portion of one or more of the foregoing components may be located at or near the lot 100. In some embodiments, at least a portion of the foregoing components may be located remotely and may be accessed via the electronic network 150.

In various embodiments, the electronic network 150 may be a wide area network ("WAN"), a local area network ("LAN"), personal area network ("PAN"), or the like. In some embodiments, electronic network 150 includes the Internet, and information and data provided between various systems occurs online. "Online" may mean connecting to or accessing source data or information from a location remote from other devices or networks coupled to the internet. Alternatively, "online" may refer to connecting or accessing an electronic network (wired or wireless) via a mobile communications network or device. The Internet is a worldwide system of computer networks—a network of networks in which a party at one computer or other device connected to the network can obtain information from any other computer and communicate with parties of other computers or devices. The most widely used part of the Internet is the World Wide Web (often-abbreviated "WWW" or called "the Web"). In some embodiments, the electronic network 150 includes or is in communication with a telecommunications network, e.g., a cellular network.

The plurality of sensors 125 may be distributed in the lot. In some embodiments, the plurality of sensors 125 may include one or more sensors configured to one or more of detect a location of a customer, capture audio data, identify a vehicle, or the like. In some embodiments, the plurality of sensors 125 includes one or more audio sensors such as a microphone. In some embodiments, the plurality of sensors includes an infrared sensor, a pressure sensor, or any other suitable type of sensor.

In the embodiment depicted in FIG. 1, the entrance element 130 is positioned at an entrance 132 of the lot 100. However, in other embodiments, any suitable location for the entrance element 130 may be used, such as proximate to the user interface device 135, etc. The entrance element 130 may include one or more of: a visual element such as a symbol, QR code, text, or the like; an audio element such as a spoken word or phrase, a jingle, an audio cue, a sound not audible to a human but detectable by an electronic device, or the like; an electronic signal such as an electronic message, a near-field communication, a radio signal, or the like, or any other suitable type of element that may be detected by an electronic device such as the user system (e.g., mobile device) of the user. As discussed in further detail below, an indication that the mobile device of the user has detected the entrance element 130 may be used to indicate a presence of the customer in the lot 100, authenticate the customer, etc.

In the embodiment depicted in FIG. 1, the user interface device 135 is positioned proximate to the entrance 132 of the lot 100, but any suitable location may be used. The user interface device 135 may include, for example a kiosk, a terminal, an interactive display, or the like. The user interface device 135 may include an input device such as a keyboard, touch screen, microphone, or the like, and may include an output device such as a display, a speaker, a lighting element, or the like. The user interface device 135 may be configured to receive information from the customer such as, for example, vehicle preference information, customer authentication information, search query information, financial information, or the like. In some embodiments, the user interface device 135 operates as a customer interface for the vendor system, e.g., as a terminal for a remote system.

In the embodiment depicted in FIG. 1, the access restriction device 140 includes a gate 170 with an electronic locking mechanism 175. In other embodiments, the access restriction device 140 may include any suitable means of restricting access, such as a door with a lock, retractable vehicle spike strips, an autonomous garage door, or the like. As discussed in further detail below, the access restriction device 140 may be employed to restrict access to the lot to authenticated customers and/or vehicles 145.

Figure 2:
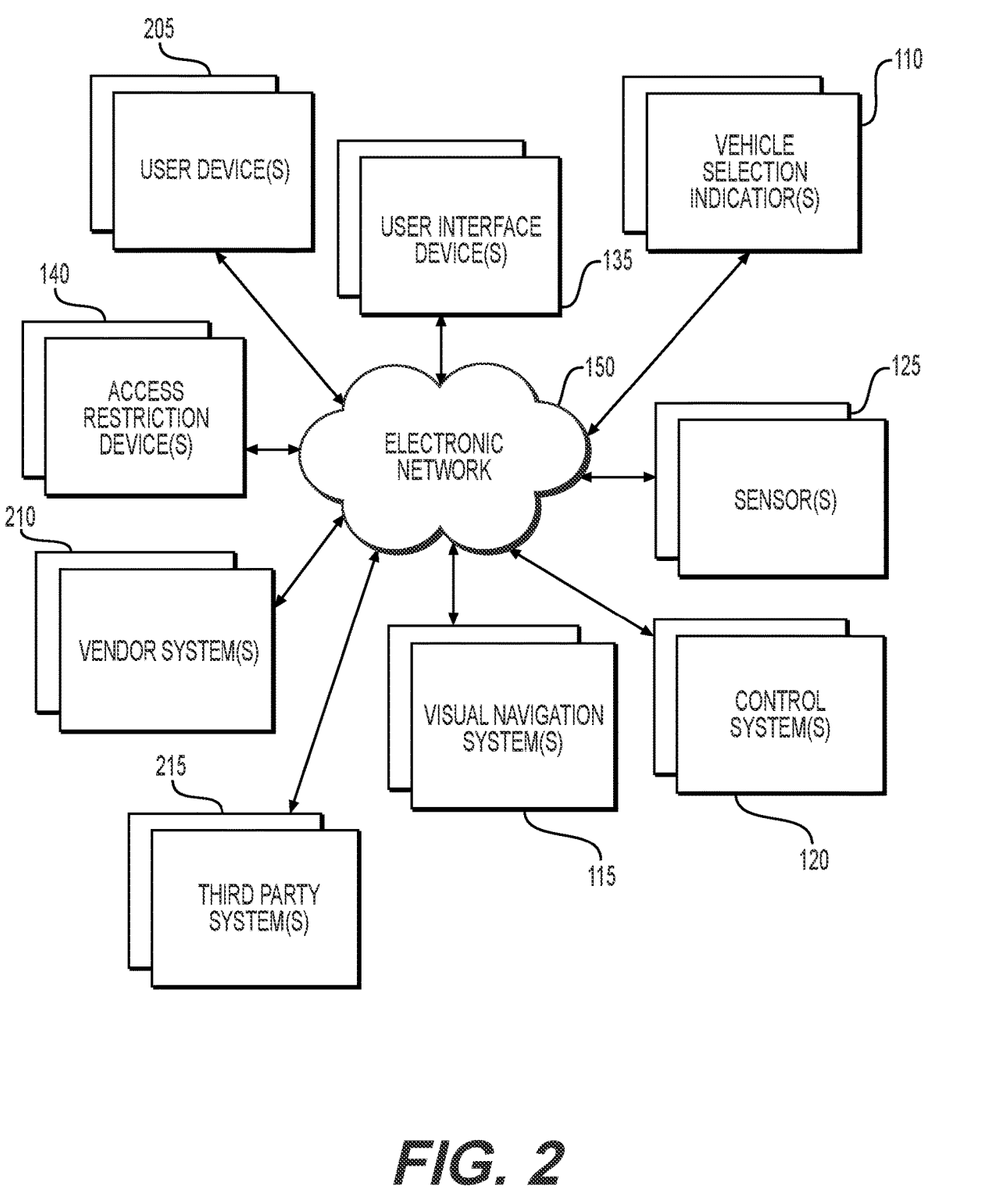
FIG. 2 depicts an exemplary computing environment for implementing an autonomous vehicle vendor lot, according to one or more embodiments.

FIG. 2 depicts an exemplary computing environment that may be utilized with techniques presented herein. One or more user device(s) 205, one or more vehicle selection indicators 110, one or more visual navigation system(s) 115, one or more control system(s) 120, one or more sensors 125, one or more user interface device(s) 135, one or more access restriction device(s) 140, one or more vendor system(s) 210, and/or one or more third-party system(s) 215 may communicate across the electronic network 150. The systems and devices of FIG. 2 may communicate in any arrangement. As will be discussed herein, systems and/or devices of the computing environment may communicate in order to provide access and/or guidance for a customer and/or a vehicle driver in the autonomous lot 100.

The user device 205 may be a computer system such as, for example, a desktop computer, a mobile device, etc. In an exemplary embodiment, the user device 205 is a cellphone, or the like. In some embodiments, the user device 205 may include an electronic application installed on a memory of the user device 205. In some embodiments, the electronic application is associated with a vendor associated with the lot 100. For example, the electronic application may include customer authentication tools, financial assessment tools, product search tools, or the like that are configured to interact with the vendor system 210 and/or other components of the computing environment. In some embodiments, the user device 205 includes one or more sensors configured to capture data such as, for example a camera configured to capture image data, a microphone configured to capture audio data, a positioning device configured to capture location data, or any other suitable type of sensor or receiver.

The vendor system 210 may be a system located in the lot 100, or may be a remote system. The vendor system 210 may include one or more of an inventory database for the lot 100, one or more machine learning models, a customer information database, and/or instructions for operating various components of the lot 100. The third party system 215 may include one or more of a financial system associated with a financial entity that includes information related to customer financial data such as information associated with a loan pre-authorization, financing pre-qualification, credit information, etc.

Although depicted as separate components in FIG. 2, it should be understood that a component or portion of a component may, in some embodiments, be integrated with or incorporated into one or more other components. For example, a portion of the vendor system 210 may be provided to the user device 205 as an electronic portal via the electronic application. At least a portion of control system 120 may be integrated into the vendor system 210. Any suitable arrangement of the various systems and devices of the computing environment may be used. In some embodiments, the electronic network includes a first network, e.g., the internet, that is usable to communicate between the user device 205 and the vendor system 210, and a second network, such as a local area network or private network, that is usable to communicate between the control system 120 and devices operated by the control system 120.

Figure 3:
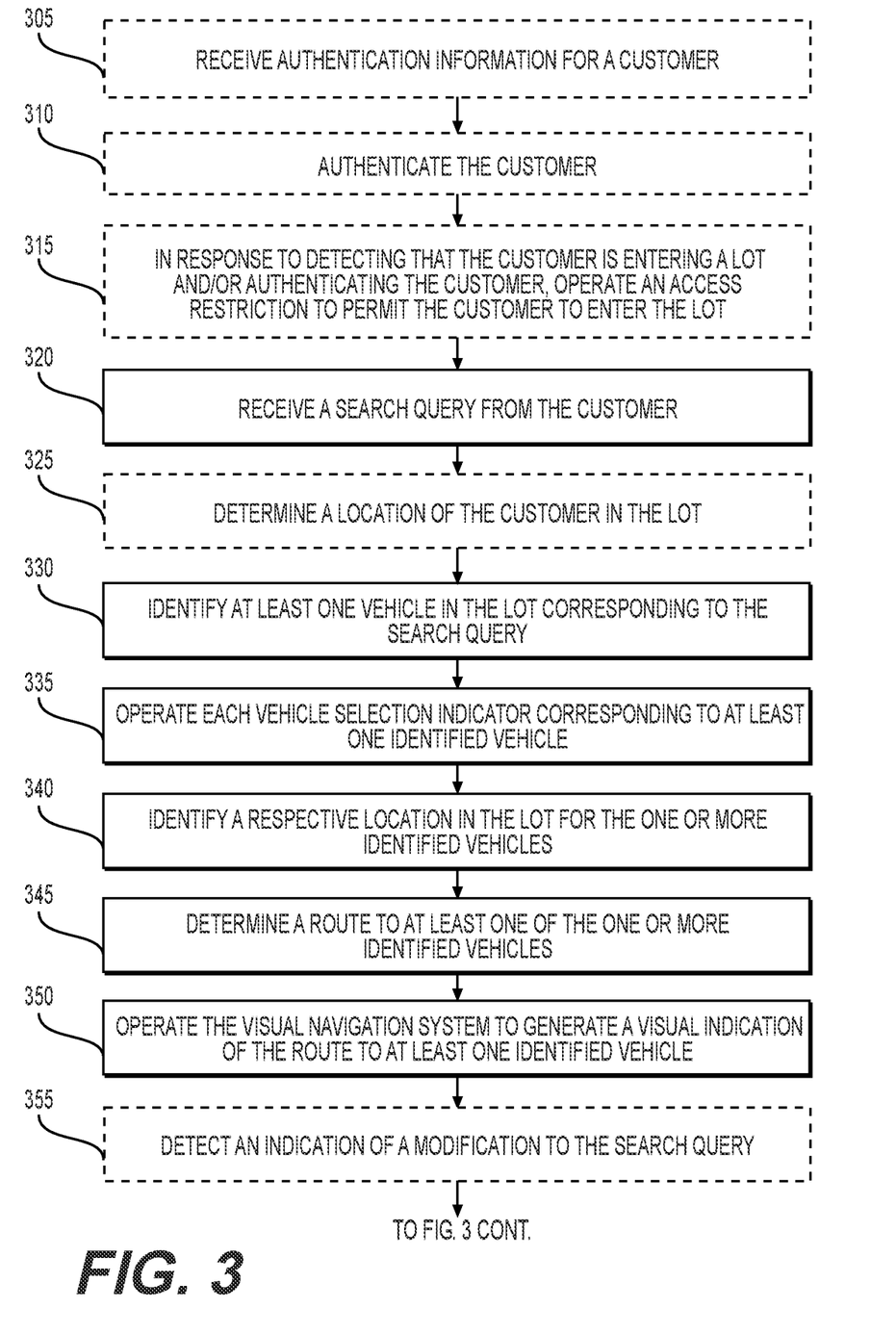
FIG. 3 depicts a flowchart of an exemplary method for operating an autonomous vehicle vendor lot, according to one or more embodiments.

FIG. 3 illustrates an exemplary process for operating an autonomous vehicle vendor lot such as the lot 100, discussed above. In the method below, various acts are described as performed or executed by the control system 120. However, it should be understood that in various embodiments, various components of the computing environment discussed above may execute instructions or perform acts including the acts discussed below. Further, it should be understood that in various embodiments, various steps may be added, omitted, and/or rearranged in any suitable manner.

Optionally, at step 305, the vendor system may receive authentication information for a customer. In some embodiments, the customer may submit authentication information to the vendor system 210 via an electronic application on a user device 205. In some embodiments, the customer may submit the authentication information via the user interface device 135. In some embodiments, the customer may submit the authentication information via a system remote from the lot 100, such as a user computer system. Authentication information may include, for example, account information for the customer, financial information such as credit information, a loan pre-qualification or financing pre-approval, or the like. In some embodiments, the customer may be authenticated and/or register an account with the vendor system 210 prior to visiting the lot 100. In some embodiments, the authentication information may include personally identifying information usable to verify an identity of the customer.

In some embodiments, the customer may submit the authentication information indirectly. For example, in some embodiments, the customer may request, authorize, or the like, another entity e.g., the third party system 215 to provide and/or release the authentication information to the vendor system 210. For example, a customer may have a loan prequalification from a financial institution. The customer may access or generate a user account with the vendor system 210, and authorize the vendor system 210 to obtain the loan prequalification from the financial institution.

Optionally, at step 310, the vendor system 210 may authenticate the customer. Any suitable technique for authenticating the customer, e.g., confirming an identity of the customer, may be used. In some embodiments authenticating the customer includes detecting that the customer is located at and/or is entering the lot 100. In some embodiments, the customer uses the user device 205, e.g., a mobile device, to capture the entrance element 130 positioned at the entrance 132 of the lot 100. The electronic application on the mobile device may transmit a message to the vendor system 210 based on the captured entrance element 130 and/or on authentication information associated with the user device 205. In some embodiments, the user device 205 may, automatically or in response to a user instruction, connect to the network 150 associated with the lot 100, and the electronic application may recognize the network 150, and transmit a message to the vendor system 210 based on the connection with the network 150. In some embodiments, a positioning mechanism, e.g., a global positioning system (GPS) mechanism, on the user device 205 may indicate that the customer is at a location associated with the lot 100 and, in response to the indication, the electronic application on the user device 205 may transmit a message to the vendor system 210. The vendor system 210 may, for example, authenticate the customer using the transmitted message based on the authentication information submitted in step 305.

Optionally, at step 315, in response to detecting that the customer is entering the lot 100 and/or authenticating the customer, the vendor system 210 may operate the access restriction device 140 to permit the customer to enter the lot 100. In some embodiments, the vendor system 210 is configured to only operate the access restriction device 140 to permit the customer to enter the lot 100 in response to a successful authentication of the customer in step 310.

At step 320, the vendor system 210 may receive a search query from the customer. In some embodiments, the search query may be received prior to the customer entering the lot 100. In some embodiments, the search query may be received after the customer has arrived at the lot 100. In various embodiments, the search query may be received from the user device 205, one or more of the plurality of sensors 125, the user interface device 135, or any other suitable system. In some embodiments, the search query may be received prior to the customer arriving at the lot 100, and the vendor system 210 is configured to retrieve the search query in response to authentication of the customer and/or detection that the customer has arrived at the lot 100.

In some embodiments, the vendor system 210 receives audio data, e.g., a verbal request uttered by the customer captured via the one or more sensors 125. The vendor system 210 may generate the search query by employing a natural language processing technique on the captured audio data. In some embodiments, as discussed in further detail below, the vendor system 210 may track behavior of the customer in the lot 100, e.g., location, vehicles visited, etc., and may generate and/or adjust a search query based on such tracked information. In some embodiments, as discussed in further detail below, the vendor system 210 may employ a machine learning technique to generate the search query.

Optionally, at step 325, the vendor system 210 may determine a location of the customer in the lot 100. In some embodiments, the determination may be based on the customer interacting with the user interface device 135 and a predetermined location of the user interface device 135. In some embodiments, the determination may be based on image data captured by the user device 205, e.g., an image of the entrance element 130 or another visual element at a predetermined location. In some embodiments, the determination may be based on a detection from one or more of the sensors 125. For example, in some embodiments, the sensors 125 include a plurality of microphones distributed in the lot 100, and the vendor system 210 may use audio data from the microphones to triangulate or otherwise determine the location of the customer. In some embodiments, the sensors 125 include presence sensors such as an infrared sensor or the like at predetermined locations. In some embodiments, the determination may be based on the positioning mechanism on the user device 205.

At step 330, the vendor system 210 may identify at least one vehicle 145 in the lot 100 corresponding to the search query. In some embodiments, the vendor system 210 may access the inventory database for the lot 100 to make the identification(s). Any suitable search technique may be used such as, for example, a comparison of features included in the search query with features of vehicles 145 stored in the lot 100. In some embodiments, the vendor system 210 is configured to identify a threshold minimum and/or maximum number of vehicles 145. In some embodiments, a vehicle 145 may be identified in response to a threshold amount of correspondence to the search query. In some embodiments, identified vehicles 145 may be ranked relative to each other based on respective correspondence to the search query.

At step 335, the vendor system 210 may operate each vehicle selection indicator 110 corresponding to the one or more identified vehicles 145. In some embodiments, the vendor system 210 may be configured to associate a particular color with the customer, and may operate the corresponding vehicle selection indicators to generate visual indications having the color corresponding to the customer. In this manner, the method may be performed simultaneously and/or asynchronously for multiple customers, each customer being associated with a different color. In some embodiments, the operation of the vehicle selection indicators 110 may be performed in response to the detection that the customer has entered the lot 100, e.g., when the search query was previously received prior to the customer entering the lot 100.

At step 340, the vendor system 210 may identify a respective location in the lot 100, e.g., a respective one of the parking spots 105, for the one or more identified vehicles 145. For example, in some embodiments, the respective parking spot 105 for each vehicle 145 in the lot 100 may be stored in the inventory database and retrieved by the vendor system 210. In some embodiments, the one or more sensors 125 are used to identify a vehicle located in a particular parking spot 105, e.g., via capturing an image of the vehicle 145, an indicator element on the vehicle such as a QR code or license plate or the like, or any other suitable means of detection.

At step 345, the vendor system 210 may determine a route to at least one of the one or more identified vehicles 145. In some embodiments, the route includes all of the identified vehicles 145. In some embodiments, the route originates from a predetermined start location, e.g., the entrance 132 of the lot 100 and/or the location of the user interface device 135, or any other suitable location. In some embodiments, the route originates at the location of the customer determined at step 325.

In some embodiments, the determined route may be configured to minimize a total travel for the customer to all of the identified vehicles 145. In some embodiments, the route may be configured to pass by identified vehicles 145 in an order corresponding to the relative ranking of the vehicles 145 based on the search query. In some embodiments, the route may be configured to pass by a vehicle 145 not identified based on the search query, such as a vehicle 145 predicted to be of interest to the customer. In some embodiments the route may be configured so that the customer does not intersect with another customer and/or a vehicle traveling through the lot 100. In some embodiments, one or more of the foregoing factors and/or additional factors are applied in conjunction with each other, e.g., with applied weights, to determine the route. In some embodiments, a machine learning technique is employed to determine the route such as, for example, a genetic learning algorithm, and/or a neural network trained (e.g., based on locations of search results, criteria for travel between the results, and/or weights for the criteria as training data, and predetermined routes as ground truth), to output a route between locations of input search results that optimizes for input criteria, or the like. In some embodiments, the determination of the route is performed iteratively, continuously, periodically, and/or in response to a command or instruction from another component of the lot 100, e.g., so as to update the route based on, for example, motion of the customer, other customers, or a vehicle 145 in the lot 100, adjustments to the search query, or other factors.

At step 350, the vendor system 210 may operate the visual navigation system 115 to generate a visual indication of the route to the at least one identified vehicle 145. In some embodiments, the vendor system 210 operates each visual indicator 160 at a location corresponding to at least a portion of the determined route. In some embodiments, the vendor system 210 operates the visual indicator(s) 160 between the current location of the customer and a next vehicle 145 along the route. In some embodiments, the vendor system 210 may update or adjust the operation of the visual navigation system 115, e.g., based on motion of the customer along the route, changes to the route, a determination that the customer has deviated from the route, or other factors. In some embodiments, the operation of the visual navigation system 115 may be performed in response to the detection that the customer has entered the lot 100, e.g., for circumstances in which the search query was previously received prior to the customer entering the lot 100.

In some embodiments, the visual navigation system 115 may be configured to generate an augmented reality visual display indicative of the route to the at least one identified vehicle 145. For example, the augmented reality visual display may be configured to generate and display a path that connects the visual indicators 160 positioned along the route on a display of a mobile device or augmented reality device of the customer.

Optionally, at step 355, the vendor system 210 may detect an indication of a modification to the search query. For example, in some embodiments, the customer may provide a new and/or updated search query, e.g., via the user device 205, the user interface device 135, and/or via a spoken utterance captured by the sensors 125.

In some embodiments, the vendor system 210 may predict a search query for the customer. For example, in some embodiments, the vendor system 210 may capture a spoken utterance from the customer and, based on a natural language processing of the captured utterance, determine that the spoken utterance pertains to a preference for or against a particular feature, and generate an updated search query based on such feature. In some embodiments, the vendor system may determine that the customer is interested in a vehicle not identified based on the search query, and may generate or update a search query based on features associated with that vehicle. For example, the customer may deviate from the route to a location of a vehicle not identified based on the search query, and/or may pause at a location of a vehicle not identified based on the search query for at least a threshold period of time. The vendor system 210 may identify predicted vehicles based on the predicted search query.

In some embodiments, multiple persons, e.g., multiple customers, may be in the lot 100 simultaneously. In some embodiments, the vendor system 210 may be configured to differentiate between spoken utterances from different persons. For example, in some embodiments, the vendor system 210 may differentiate between spoken utterances based on one or more of a determined location of a speaker, one or more voice characteristics of the speaker, an association between content of a spoken utterance and the search query for the customer, a keyword or the like in the spoken utterance assigned and/or usable to identify the customer, etc. Any suitable technique for differentiating between speakers may be used.

In some embodiments, the vendor system 210 may automatically adjust the route and the operation of the vehicle selection indicators 110 and the visual navigation system 115 based on the identified predicted vehicles. In some embodiments, the vendor system 210 may prompt the customer for instructions. The prompt may be in the form of, for example, a selectable option on the electronic application of the user device 205 or the user interface device 135, or a spoken language prompt generated e.g., via a natural language synthesizer.

In an illustrative example, a customer may have submitted a search query for a mid-size sedan. While travelling along the route indicated by the visual selection indicators 110 and visual navigation system 115, the customer may utter, "I wish there was something flashier available in my price range . . . " The vendor system may capture audio data for that utterance via sensors 125, and determine that the customer may have a preference for a sport vehicle, and for a budget consistent with the results in the previous search query. The vendor system 210 may generate a predicted search query based on the foregoing features and identify at least one matching vehicle in the lot. The vendor system 210 may employ a natural speech synthesizer to output a message such as "We actually have several sportier models that might fit your budget. Do you want to take a look?" In response to an agreement from the customer, the vendor system 210 may update the route and the operation of the visual selection indicators 110 and the navigation system 115.

In another illustrative example, the vendor system 210 may have determined that the customer may be interested in a convertible, and determined a route for the identified mid-size sedans that passes by a convertible matching the customer's preferences. In response to the customer pausing by the convertible, e.g., for a threshold period of time, the vendor system 210 may provide the customer with information about the convertible, and/or prompt the customer to adjust the search query in the manner discussed above.

In some embodiments, the vendor system 210 may use adjustments to the search query and/or predicted search queries to update or adjust a search procedure. For example, in an exemplary embodiment, the vendor system 210 may employ a machine learning model, trained with search queries as training data and vehicles selected by a customer as ground truth, to generate search results predicted to be of interest to a customer for a given search query. The vendor system 210 may use the one or more vehicles identified in the predicted search query to update, tune, or retrain the machine learning model so that, for example, the machine learning model may be more likely to predict the customer's interest for the one or more vehicles that were not previously identified based on the search query.

Optionally, at step 360, the vendor system 210 may receive a vehicle selection indication corresponding to one of the identified vehicles 145. The indication may be a spoken utterance from the customer, e.g., "I want to buy this car!" or "I want to test drive this one," or "Tell me more about the red one in spot D4," or the like. The indication may be via a selection from the user device 205 or the user interface device 135, or the like. Any suitable means of indication of a selection may be used.

Optionally, at step 365, in response to receiving the vehicle selection indication, the vendor system 210 may one or more of: cause a key storage device to release a key corresponding to the selected vehicle; initiate a transaction associated with the selected vehicle, output information related to the selected vehicle, e.g., via synthesized speech, a message transmitted to the user device 205 or displayed on the user interface device 135, or the like. In response to detecting that the selected vehicle is leaving its corresponding parking spot 105 and/or in response to receiving the selection indication, the vendor system 210 may determine a route and operate the visual navigation system 115 to guide the customer, e.g., to exit the lot and/or drive the selected vehicle out of the lot 100.

As discussed above, the route for a customer may be determined so as to efficiently guide the customer to identified vehicles 145 and/or other criteria. It may also be beneficial to arrange the vehicles 145 in the lot 100 in a manner that facilitates such routes. For instance, in some embodiments, the vendor system 210 may identify one or more clusters of vehicles that are likely to appear together as results to a search query. As an example, red sports cars of different make or model, vehicles of the same make and model but different year or mileage or the like, or other groupings of vehicles, may be likely to appear together as results for a given search query. The placement of vehicles in such an identified cluster may be used to adjust a route that may result from such a search query.

For example, in some embodiments, the vendor system 210 may determine placement for a cluster of vehicles so that the cluster of vehicles is close together in order to, for example, reduce a total route length for a customer to visit the vehicles in the cluster. In some embodiments, the vendor system 210 may use the placement of vehicles in the identified cluster to shepherd the route toward or away from one or more locations in the lot 100. For instance, placements for the vehicles in the cluster may be determined such that a vehicle not identified based on the search query, but predicted to likely be of interest to the customer, lies along the route between two vehicles in the cluster so that it will be seen as the customer travels along the route. Placements for vehicles in the cluster may be determined to minimize or reduce a likelihood of intersections of routes based on different search queries, other customers, vehicles travelling in the lot, etc. In some embodiments, a placement for one or more vehicles 145 in the parking spots 105 may be determined, and such placements may be transmitted to a person employed by the lot to re-arrange the vehicles 145. However, requiring the use of an employee to re-arrange vehicles 145 in the lot 100 may detract from the autonomous nature of the lot.

Thus, to continue with the method of FIG. 3 for the operation of an autonomous vehicle vendor lot, optionally, at step 370, the vendor system 210 may detect that a vehicle associated with the lot 100 is entering the lot 100. The vehicle may be returning from a test drive with a customer, returning from a maintenance appointment, a new addition to the inventory of the lot 100, or the like. Any suitable type of detection may be used such as, for example, a sensor 125 located proximate to the entrance 132 configured to capture an image of the vehicle, a license plate of the vehicle, a marker such as a QR code positioned on the vehicle, or the like. A sensor 125 may also be configured to capture a signal transmitted by a device on the vehicle. The vehicle may include a location detection mechanism such as a GPS, which may be configured to transmit a location of the vehicle to the vendor system 210.

Optionally, at step 375, the vendor system 210 may identify at least one further vehicle 145 in the lot 100 that is likely to be identified along with the entering vehicle in response to a search query. The identification may be based on any suitable criteria such as, for example, previous search results that included the entering vehicle, a comparison of features of the entering vehicle with features of vehicles 145 in the lot 100, a machine learning model trained to cluster vehicles likely to appear together in response to a search query, or the like.

Optionally, at step 380, the vendor system 210 may determine a parking spot 105 for the entering vehicle in the lot 100 that is configured to cause a route to meet one or more criteria. For example, in some embodiments, the vendor system 210 may determine a parking spot 105 for the entering vehicle so as to shorten or optimize a route for visiting the entering vehicle and the at least one further vehicle 145 in the lot 100 that is likely to be identified along with the entering vehicle in response to a search query.

Optionally, at step 385, the vendor system 210 may provide a driver of the entering vehicle with directions and/or guidance to the determined parking spot 105 for the entering vehicle. In some embodiments, the directions and/or guidance may be in the form of a message to a mobile device of the driver, via a mapping electronic application of the mobile device or of the vehicle, or the like. In some embodiments, the directions and/or guidance may be provided by generating a route to the determined parking spot 105, and operating the visual navigation system 115 and/or the vehicle selection indicator 110 for the determined parking spot 105 to generate a visualization of the route to the determined parking spot 105 for the entering vehicle.

Further aspects of the disclosure are discussed in the additional embodiments below. It should be understood that embodiments in this disclosure are exemplary only, and that other embodiments may include various combinations of features from other embodiments, as well as additional or fewer features.

In an exemplary embodiment, one or more components of the autonomous lot 100 may be portable, e.g., one or more of the vehicle selection indicators 110, the visual navigation system 115, the sensors 125, the user interface device 135, etc. Further, one or more components may be operated remotely, e.g., one or more of the control system 120, the vendor system 210, etc. Thus, in some embodiments, the autonomous lot 100 itself may be portable, e.g., by transporting one or more portable components to a space for forming the lot and operating one or more remote components remotely. For example, a "pop-up" vehicle dealership may be formed at an available vacant space, operated for a period of time, and then disassembled and removed.

In some embodiments, one or more of the parking spots 105 may include or be proximate to an electronic charging station, and the parking spot 105 determined for an entering vehicle may be determined based on whether the entering vehicle is chargeable via an electronic charging station and/or is in need of charging.

In some embodiments, the vendor system 210 may track a respective maintenance condition of the vehicles 145 in the lot 100. In some embodiments, the lot 100 may include a parking spot 105 designated as a maintenance bay, and the parking spot 105 determined for an entering vehicle may be determined based on whether the entering vehicle is in need of maintenance.

In an exemplary embodiment, the lot 100 is an autonomous lot and is a lot configured to operate in a "hands-free" manner. In other words, a customer need not interact with a user device, user interface device, or the like, but instead may interact with the lot 100 via the sensors 125 distributed in the lot.

In general, any process discussed in this disclosure that is understood to be computer-implementable, such as the process illustrated in FIG. 3, may be performed by one or more processors of a computer system, such as the vendor system 210, as described above. A process or process step performed by one or more processors may also be referred to as an operation. The one or more processors may be configured to perform such processes by having access to instructions (e.g., software or computer-readable code) that, when executed by the one or more processors, cause the one or more processors to perform the processes. The instructions may be stored in a memory of the computer system. A processor may be a central processing unit (CPU), a graphics processing unit (GPU), or any suitable types of processing unit.

A computer system, such as vendor system 210, may include one or more computing devices, such as the control system 120. One or more processors of a computer system may be included in a single computing device or distributed among a plurality of computing devices. A memory of the computer system may include the respective memory of each computing device of the plurality of computing devices.

Figure 4:
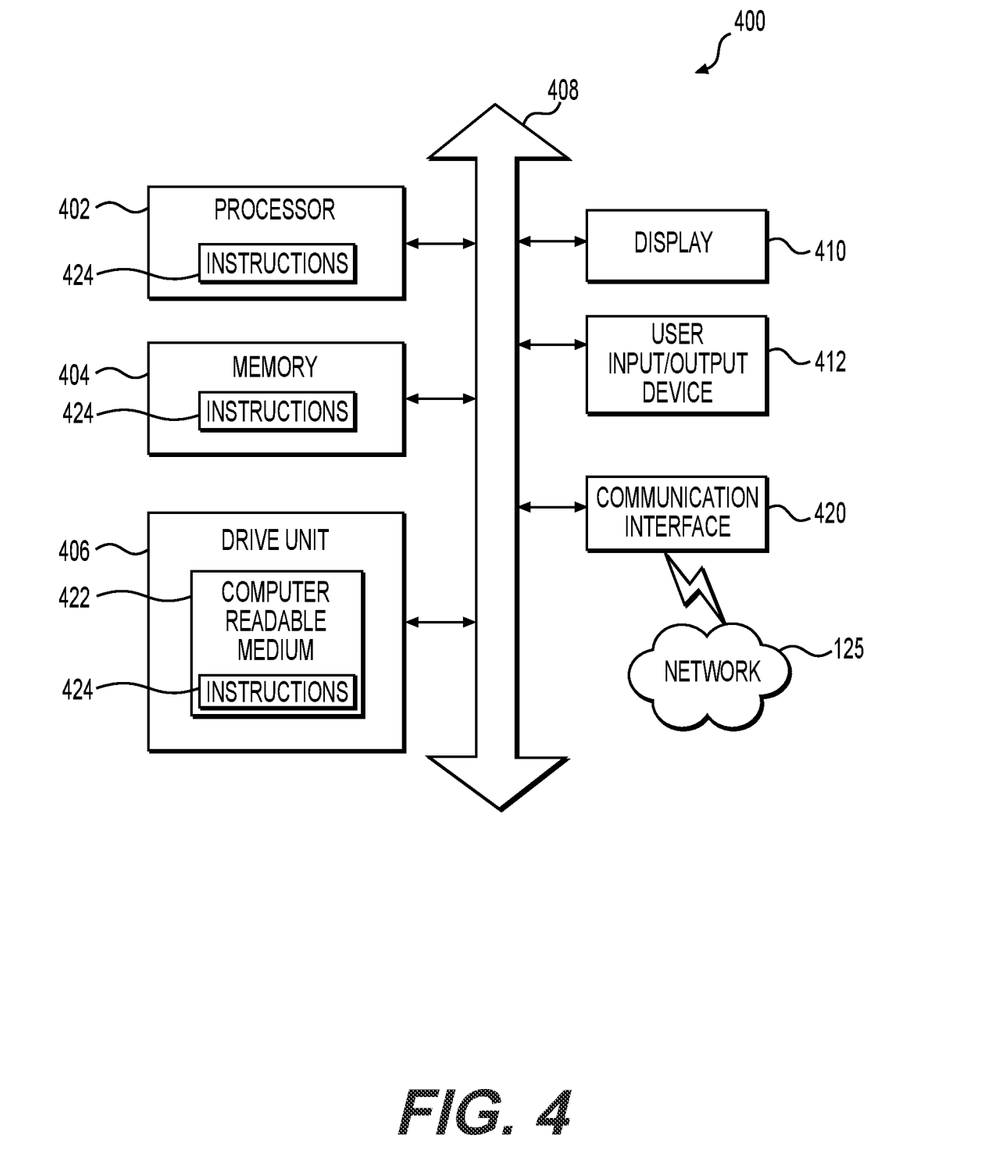
FIG. 4 depicts an example of a computing device, according to one or more embodiments.

FIG. 4 is a simplified functional block diagram of a computer 400 that may be configured as a device for executing the methods of FIG. 3, according to exemplary embodiments of the present disclosure. For example, the computer 400 may be configured as the vendor system 210 according to exemplary embodiments of the present disclosure. In various embodiments, any of the systems herein may be an assembly of hardware including, for example, a data communication interface 420 for packet data communication. The computer 400 also may include a central processing unit ("CPU") 402, in the form of one or more processors, for executing program instructions. The computer 400 may include an internal communication bus 408, and a storage unit 406 (such as ROM, HDD, SDD, etc.) that may store data on a computer readable medium 422, although the computer 400 may receive programming and data via network communications. The computer 40 may also have a memory 404 (such as RAM) storing instructions 424 for executing techniques presented herein, although the instructions 424 may be stored temporarily or permanently within other modules of computer 400 (e.g., processor 402 and/or computer readable medium 422). The computer also may include input and output ports 412 and/or a display 410 to connect with input and output devices such as keyboards, mice, touchscreens, monitors, displays, etc. The various system functions may be implemented in a distributed fashion on a number of similar platforms, to distribute the processing load. Alternatively, the systems may be implemented by appropriate programming of one computer hardware platform.

Program aspects of the technology may be thought of as "products" or "articles of manufacture" typically in the form of executable code and/or associated data that is carried on or embodied in a type of machine-readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer of the mobile communication network into the computer platform of a server and/or from a server to the mobile device. Thus, another type of media that may bear the software elements includes optical, electrical and electromagnetic waves, such as used across physical interfaces between local devices, through wired and optical landline networks and over various airlinks. The physical elements that carry such waves, such as wired or wireless links, optical links, or the like, also may be considered as media bearing the software. As used herein, unless restricted to non-transitory, tangible "storage" media, terms such as computer or machine "readable medium" refer to any medium that participates in providing instructions to a processor for execution.

While the presently disclosed methods, devices, and systems are described with exemplary reference to transmitting data, it should be appreciated that the presently disclosed embodiments may be applicable to any environment, such as a desktop or laptop computer, an automobile entertainment system, a home entertainment system, etc. Also, the presently disclosed embodiments may be applicable to any type of Internet protocol.

It should be appreciated that in the above description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those skilled in the art. For example, in the following claims, any of the claimed embodiments can be used in any combination.

Thus, while certain embodiments have been described, those skilled in the art will recognize that other and further modifications may be made thereto without departing from the spirit of the invention, and it is intended to claim all such changes and modifications as falling within the scope of the invention. For example, functionality may be added or deleted from the block diagrams and operations may be interchanged among functional blocks. Steps may be added or deleted to methods described within the scope of the present invention.

The above disclosed subject matter is to be considered illustrative, and not restrictive, and the appended claims are intended to cover all such modifications, enhancements, and other implementations, which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description. While various implementations of the disclosure have been described, it will be apparent to those of ordinary skill in the art that many more implementations and implementations are possible within the scope of the disclosure. Accordingly, the disclosure is not to be restricted except in light of the attached claims and their equivalents.

What is claimed is:

1. An autonomous lot, comprising:
a plurality of vehicle selection indicators distributed in the lot, each vehicle selection indicator associated with a respective parking spot in the lot and operable to generate a visual indication indicative of a selection of a vehicle in the respective parking spot;
a visual navigation system operable to generate a visual indication of a route between various locations in the lot; and
a control system operatively connected to the plurality of vehicle selection indicators and the visual navigation system, and configured to:
receive a vehicle search query;
identify at least one vehicle in the lot corresponding to the vehicle search query;
operate each vehicle selection indicator corresponding to the identified at least one vehicle;
identify a respective location in the lot for the at least one identified vehicle; and
operate the visual navigation system to generate a visual indication of a route to the at least one identified vehicle.

2. The autonomous lot of claim 1, wherein the route to the at least one identified vehicle originates at a predetermined start location in the lot.

3. The autonomous lot of claim 1, wherein:
the control system is further configured to determine a location in the lot of a user associated with the vehicle search query; and
the route to the at least one identified vehicle originates at the determined location of the user in the lot.

4. The autonomous lot of claim 3, wherein the location of the user in the lot is determined via a positioning mechanism of a user device that transmitted the vehicle search query to the control system.

5. The autonomous lot of claim 4, wherein the control system is further configured to perform at least the operation of each vehicle selection indicator corresponding to the identified at least one vehicle and of the navigation system in response to detecting that the user has entered the lot.

6. The autonomous lot of claim 3, further comprising:
a plurality of sensors distributed in the lot, wherein the location of the user in the lot is determined via the plurality of sensors.

7. The autonomous lot of claim 6, wherein:
the plurality of sensors includes a plurality of audio sensors; and
the control system is further configured to:
receive voice data from the user at various locations in the lot via the plurality of audio sensors; and
generate the vehicle search query based on the received voice data.

8. The autonomous lot of claim 1, further comprising:
an entrance element associated with the lot, wherein the control system is further configured to perform at least the operation of each vehicle selection indicator corresponding to the identified at least one vehicle and of the navigation system in response to receiving an indication that the entrance element has been captured by a sensor of a user device associated with the user.

9. The autonomous lot of claim 8, wherein the entrance element includes one or more of a visual element, an audio element, or an electronic signal.

10. The autonomous lot of claim 1, further comprising:
a user interface device positioned in the lot and configured to receive the vehicle search query and transmit the vehicle search query to the control system.

11. The autonomous lot of claim 1, wherein the control system is further configured to authenticate a user associated with the vehicle search query, and only identify the at least one vehicle in the lot in response to the authentication of the user.

12. The autonomous lot of claim 1, wherein the visual navigation system includes a plurality of visual indicators distributed in the lot.

13. The autonomous lot of claim 12, wherein at least one of the plurality of visual indicators and the plurality of vehicle selection indicators are configured to generate light of difference colors corresponding to different users in the lot.

14. The autonomous lot of claim 1, wherein the visual navigation system is configured to generate an augmented reality visual display indicative of the route to the at least one identified vehicle.

15. A control system for an autonomous lot, comprising:
a memory storing instructions; and
a processor operatively connected to the memory and configured to execute the stored instruction to perform acts including:
receiving a vehicle search query;
identifying a plurality of vehicles in the lot corresponding to the vehicle search query;
operating a respective vehicle selection indicator in the lot corresponding to each identified vehicle in the plurality of vehicles to generate a visual indication of the identification of the plurality of vehicles;
identifying a respective location in the lot for each identified vehicle of the plurality of vehicles; and
operating a visual navigation system to generate a visual indication of a route that includes each identified vehicle in the plurality of vehicles.

16. The control system of claim 15, wherein the acts further include:
detecting that a vehicle associated with the lot is entering the lot;
identifying at least one further vehicle in the lot that is likely to be identified along with the entering vehicle in a vehicle search query;
determining a parking spot for the entering vehicle in the lot configured to optimize a search navigation route to include the entering vehicle and the at least one further vehicle; and
operating the visual navigation system to generate a visualization of a parking route to the determined parking spot for the entering vehicle.

17. The control system of claim 16, wherein identifying the at least one further vehicle includes employing a first machine learning model that is trained, based on previous vehicle search queries and vehicles identified from the previous search queries, to identify other vehicle likely to be identified in a given search query along with the entering vehicle.

18. The control system of claim 15, wherein the acts further include:
tracking a location of a user associated with the vehicle search query; and
operating the visual navigation system to adjust the visual indication of the route based on the tracked location.

19. The control system of claim 15, wherein the acts further include:
receiving a vehicle selection indication corresponding to one of the identified plurality of vehicles; and
in response to receiving the vehicle selection indication, one or more of:
causing a key storage device to release a key corresponding to the selected vehicle; or
initiating a vehicle purchase or rental transaction associated with the selected vehicle.

20. A computer-implemented method of providing an autonomous lot, the method comprising:
receiving voice data from a user via a plurality of audio sensors;
determining a location of the user in the lot via the plurality of audio sensors;
generating a vehicle search query based on the received voice data;
identifying at least one vehicle in the lot corresponding to the vehicle search query;
operating a respective vehicle selection indicator in the lot corresponding to the at least one identified vehicle to generate a visual indication of a selection of the at least one identified vehicle;
identifying a respective location in the lot for the at least one identified vehicle; and
operating a visual navigation system to generate a visual indication of a route to the at least one identified vehicle, wherein:
the route originates at the determined location of the user; and
the visual navigation system includes a plurality of visual indicators distributed in the lot.

* * * * *